Patented Sept. 29, 1936

2,056,121

UNITED STATES PATENT OFFICE 2,056,121

INSECTICIDE AND METHOD OF MAKING SAME

Walter Carter, Honolulu, Territory of Hawaii

No Drawing. Application May 21, 1934,
Serial No. 726,810

5 Claims. (Cl. 167—43)

The object of my invention is to produce an insecticide to be applied to growing trees and plants for the purpose of killing insect and other parasital life thereon without, however, destroying or injuring the foliage of the trees and plants.

I believe that the hereinafter described method of preparing the insecticide is distinguished from prior related methods in the ease and simplicity of the manipulative steps to be performed in carrying out the method and also in the fact that certain substances heretofore unusable because of their toxicity toward tender plants, may be converted into efficient insecticides which are non-injurious to the plant itself.

My insecticidal composition is prepared by emulsifying and diluting in a certain manner certain so-called Diesel fuel oils of the kinds used for Diesel engines. As examples of the class of oils suitable for use in my insecticide and method of making it, the following are illustrative: (These oils are commonly used alone for killing weeds and the like by spraying the weeds therewith.)

Example I

| | Diesel fuel oil 27 plus |
|---|---|
| A. P. I. gravity | 29.3° Bé. |
| Flash (Pensky-Martens) | 186° F. |
| Viscosity at 100° F. (Saybolt-universal) | 38 |
| Viscosity at 130° F. (Saybolt-universal) | 36 |
| Sulfur | 0.52% |
| Pour point | Below 70° F. |
| B. t. u. per pound | 19,350 |
| Sediment and water | Trace |
| Carbon—Conradson | 0.08% |
| A. S. T. M. distillation— | |
| Initial | 392° F. |
| 10% | 442 |
| 50% | 515 |
| 80% | 600 |
| 90% | 656 |
| End point | 730 |

Example II

| | Diesel fuel oil 34 plus |
|---|---|
| A. P. I. gravity | 34.4° Bé. |
| Flash (Pensky-Martens) | 142° F. |
| Viscosity at 100° F. (Saybolt-universal) | 33 |
| Viscosity at 130° F. (Saybolt-universal) | 32 |
| Sulfur | 0.28% |
| Pour point | Below 35° F. |
| B. t. u. per pound | 19,482 |
| Sediment and water | Bright |
| Carbon—Conradson | Trace |
| A. S. T. M. distillation— | |
| Initial | 362° F. |
| 10% | 391 |
| 50% | 441 |
| 80% | 486 |
| 90% | 514 |
| End point | 586 |

Any of the above or similar oils are procured in the form of an emulsion, which emulsion is subsequently diluted and in this form sprayed onto the growing trees. In preparing the emulsion I may proceed as follows:

Mix 100 ccs. of water with 10 grams of a colloidal clay such as bentonite in an emulsifying apparatus and then introduce into the apparatus 100 ccs. of one of the above or similar oils. The emulsifying apparatus which I prefer to use is provided with an agitating or stirring device adapted to be rotated at a high rate of speed and furthermore, is adapted to be raised and lowered in the material to be emulsified.

I have further found that a more or less solid emulsion can be prepared by mixing in a high speed emulsifier 100 ccs. of water, 15 grams of bentonite and 100 ccs. of 27+ fuel oil.

After the emulsion is prepared in the above manner, it is diluted before spraying onto the plants. Generally speaking 1 gallon of emulsion may be diluted with 100 gallons of water.

I may use an acid diluent by adding 1 gallon of the emulsion to 100 gallons of an aqueous solution of an acid such as sulphuric acid or a salt thereof such as ammonium sulphate or a double salt such as ferrous ammonium sulphate or I may use an acid such as citric acid or a salt thereof such as ammonium citrate or a double salt such as ferrous ammonium citrate or I may use a dilute aqueous solution of an acid reacting plant nutrient.

For examples, in diluting one gallon of the emulsion, I may add 100 gallons of a weak sulphuric acid solution containing 10 cubic centimeters of sulphuric acid to 100 gallons of water or I may add 100 gallons of a .5 of 1% aqueous solution of ammonium sulphate or 100 gallons of a .1 of 1% aqueous solution of ferrous ammonium sulphate or 100 gallons of a .25% aqueous solution of citric acid or 100 gallons of a 5% aqueous solution of ammonium citrate or 100 gallons of a .2 of 1% aqueous solution of ferrous ammonium citrate or 100 gallons of an aqueous plant nutrient solution which may be composed of the following constituents:

6000 grams ammonium sulphate
    100 grams ammonium phosphate
    400 grams potassium nitrate
    500 grams iron sulphate
    1000 ccs. ammonium citrate
    100 gallons water The effect of the plant foods or of the acid or acid salt in the diluting water is to increase the dispersal of the bentonite particles, and, thereby the oil adsorbed on the bentonite particles, by changing the iso-electric point of the mixture in the proper direction, and any substance capable of accomplishing this result and which itself is not toxic to the plants at the strength used, may be employed.

I have also found that the degree of dispersal of the bentonite and oil particles is affected by the degree of acidity and although I have found the above examples to be well suited to local conditions in Hawaii, I do not expect to be limited to the specific concentrations quoted in the examples given since local conditions of water supply may make it necessary to modify the concentration of acid or acid salt used in the diluent in order to obtain the desired end.

The emulsion prepared and diluted as above has been found to be very effective in killing mealy bugs on pineapple plants.

The present invention enables an insecticide to be produced inexpensively from phytocidal oils which have all the phytocidal, and hence, insecticidal, ingredients left in them, but the treatment according to the present invention negatives the phytocidal character of the oils while retaining the insecticidal character thereof, so that the resulting product is not only safe to use on plants but can be used at much lower, and hence cheaper, dilutions than oils as heretofore used or proposed as insecticides.

Without wishing to be limited to any particular theory, I believe that the physical state of the emulsion as regards the degree of hydration of the bentonite particles in the concentrated emulsion as well as in the emulsion after it is diluted is important since the degree of dispersal of the oil particles both before and after the emulsion has been diluted appears to be dependent on the swelling or hydration of the bentonite particles. Also, the dispersion of the oil particles appears to have a decided bearing on the toxic effects of the oils on the plants sprayed therewith. I have been able to show that the rotational speed of the mixing element determines what I call the initial dispersion of the emulsion and the method of diluting the emulsion determines what I call the final dispersion of the diluted emulsion and to illustrate these features, attention is called to the following experiments: when an emulsion is prepared using the ingredients of the foregoing examples and in the same relative proportions, emulsified in a slow speed mixer and the resulting emulsion diluted with water in the ratio of 1 gallon of emulsion to 100 gallons of water, and then sprayed onto young inflorescences of pineapple plants, severe burning results. When the emulsion is prepared as above except that a high speed mixer is used, the emulsion when diluted to the above extent and sprayed onto young inflorescences produced very slight burning. When the emulsion is prepared with the high speed mixer as above and diluted to the above extent, not in water but in an aqueous solution of .5 of 1% of ammonium sulphate or an equivalent aqueous acid or acid salt solution and sprayed onto young inflorescences, then no burning resulted.

The emulsion is prepared, preferably, in an apparatus provided with mixing or agitating means, as for example, a corrugated disk, adapted to be rotated at a speed of about 1800 revolutions per minute for a period of 3 to 5 minutes at a temperature of 72° F.

I claim as my invention:—

1. The method of producing an insecticide which comprises emulsifying a Diesel fuel oil in water by means of clay of the bentonite type while subjecting it to high speed agitation, and diluting the resulting emulsion with an aqueous liquid containing a dissolved substance producing acid ions.

2. A plant spray comprising a Diesel fuel oil emulsified with water by means of clay of the bentonite type and high speed agitation and containing an acid ion producing substance.

3. The method of producing an insecticide which comprises emulsifying a Diesel fuel oil in water by means of a clay of the bentonite type while subjecting it to high speed agitation whereby the said Diesel fuel oil is procured in the form of a stable emulsion which is non-toxic to succulent plants and may be diluted and sprayed onto growing plants where its operates as an insecticide.

4. An insecticide comprising a Diesel fuel oil emulsified by means of a clay of the bentonite type and high speed agitation, the emulsion consisting of the following ingredients in substantially the following proportions:—100 ccs. of a Diesel fuel oil, 100 ccs. of water and 15 grams of bentonite, which emulsion is stable and can be sprayed on tender plants without injury to the latter.

5. An insecticide comprising a Diesel fuel oil emulsified by means of a clay of the bentonite type and high speed agitation, the emulsion consisting of the following ingredients in substantially the following proportions:—100 ccs. of a Diesel fuel oil, 100 ccs. of water and 10 grams of bentonite, which emulsion is stable and can be sprayed on tender plants without injury to the latter.

WALTER CARTER.